UNITED STATES PATENT OFFICE.

THEODORE AUGUSTUS HELWIG, OF MINERSVILLE, PENNSYLVANIA.

IMPROVEMENT IN MANUFACTURE OF PRUSSIAN BLUE.

Specification forming part of Letters Patent No. 27,716, dated April 3, 1860.

*To all whom it may concern:*

Be it known that I, THEODORE AUGUSTUS HELWIG, of Minersville, in the county of Schuylkill and State of Pennsylvania, have discovered a new and Improved Mode of Manufacturing Prussian Blue; and I do hereby declare that the following is a full and exact description thereof.

The nature of my invention consists in the application of mine-water—such as found in our coal-mines, and which is always found highly charged with sulphates of iron and free sulphuric acid—in the manufacture of Prussian blue.

To enable others skilled in the science to make and use my discovery, I will proceed to describe its construction and operation.

I construct a reservoir for the purpose of allowing impurities mechanically mixed with the mine-water to settle. This reservoir I connect with a tank, the bottom of which is covered with loose iron scraps in order to give the free sulphuric acid a chance of combining, thereby increasing the percentage of sulphate of iron. To this tank I connect a second tank, in which, it being filled with water from the first tank, the Prussian blue is precipitated by aid of the yellow prussiate of potash, giving the ordinary chemical reaction. The precipitated Prussian blue is then freed of the supernatant liquid, washed and rewashed with water acidulated with sulphuric acid, and finally with pure water. The subsiding precipitate at last is dried in a warm room heated to the proper temperature.

What I claim as my invention, and desire to secure by Letters Patent in the process aforesaid, is—

The application of mine-water containing sulphates of iron and free sulphuric acid in the manufacture of Prussian blue, or any other native mineral-water containing iron and which will produce the intended effect.

THEODORE AUGUSTUS HELWIG.

Witnesses:
  DAVID GLOVER,
  E. BONTA.